Jan. 3, 1967  A. W. VON VOLKLI  3,295,807
ELECTRICAL CABLE AND SMALL PIPE OR TUBING HANGER
Filed April 26, 1966
FIG. 1
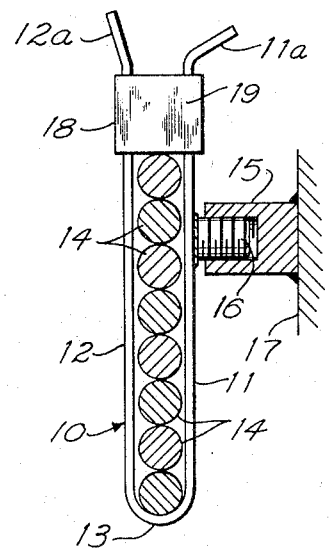
FIG. 2
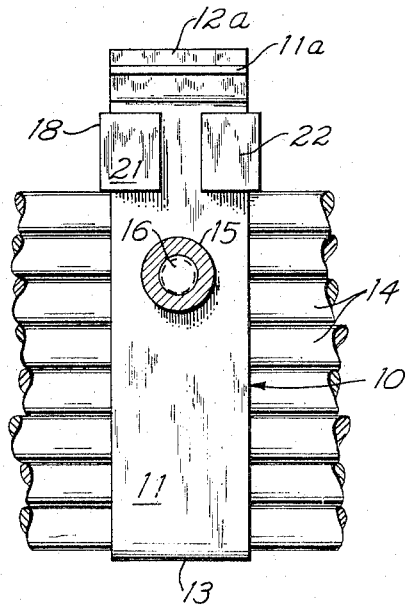
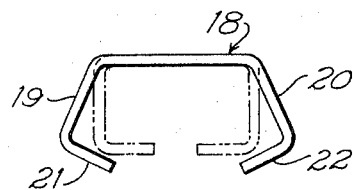
FIG. 3
FIG. 4
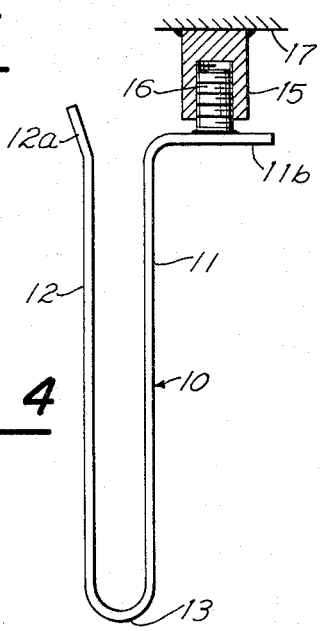
FIG. 5
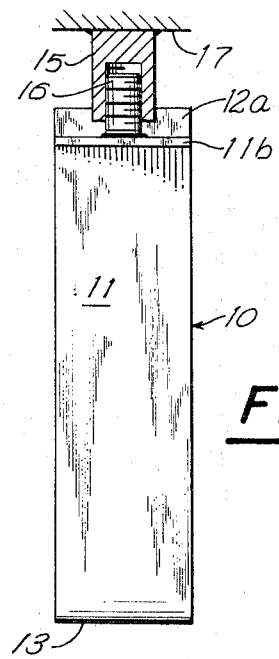
INVENTOR.
ARTHUR W. VON VOLKLI
BY
ATTORNEYS

United States Patent Office 3,295,807
Patented Jan. 3, 1967

3,295,807
ELECTRICAL CABLE AND SMALL PIPE
OR TUBING HANGER
Arthur W. Von Volkli, Rte. 4, Box 584C,
Port Orchard, Wash. 98366
Filed Apr. 26, 1966, Ser. No. 546,152
7 Claims. (Cl. 248—74)

The present invention relates to hangers and more particularly to a hanger within which a plurality of electric cables or small tubular members are securely supported.

It is well known to provide a hanger which merely supports or cradles a certain number of cables. The obvious disadvantage of such hangers is that the cables are not secured within the hanger. Other hangers provide for securing of cables within the hanger but only for a fixed or certain number of cables. The disadvantage of this hanger is that the hanger can be used effectively only when a designated number of cables are required to be supported. Prior hangers that support a varying number of cables are usually complicated and require elaborate manufacturing techniques with a resulting greater expense.

Another disadvantage of known hangers is that special tools are required to install and utilize the hangers. Also, the hangers may have to be fixedly attached to a supporting structure and cannot readily be removed when, for example, it is desired to reroute the supported cables.

It is an object of the present invention to provide a hanger which supports a varying number of cables or tubular members.

Another object is to provide a hanger capable of securely supporting the varying number of cables.

A further object is to provide a hanger that is easily removable from the supporting structure.

Another object is to provide a hanger which requires no special tools when securing the varying number of cables.

It is a further object of the invention to provide a hanger which supports the cables close to and parallel to the supporting surface with no cumbersome projections.

Another object of the invention is to provide a hanger which is simple and rugged making the hanger ideal for use under adverse conditions such as those found aboard ship.

Briefly the invention is directed to a hanger for supporting a plurality of cables or tubular members from a supporting surface. The hanger includes a substantially U-shaped member for receiving and supporting tubular members, the legs of the U-shaped member being of sufficient strength to maintain the tubular members in a stacked relationship. A clamp is then fitted over the legs of the U-shaped member with these legs projecting through the clamp. The clamp is then deformed to substantially enclose the legs and is slid along, the legs to abut the top one of the stacked tubular members. The portions of the leg members that project through the clamp are deformed outwardly to secure the clamp in an abutting relationship to the stacked tubular members. The U-shaped member and clamp are mounted on a supporting surface by a supporting means that is affixed to one of the U-shaped member's legs.

Other objects and many of the attendant advantages of this invention will be readily appreciated by reference to the following detailed description when considered in connection with the accompanying drawings wherein:

FIG. 1 is a side view of a first embodiment of the invention;

FIG. 2 is a back view of the embodiment shown in FIG. 1;

FIG. 3 is a top view of the clasp with solid lines and phantom lines showing the clasp in the open and deformed positions respectively;

FIG. 4 is a side view of another embodiment of the invention;

FIG. 5 is a front view of the embodiment shown in FIG. 4.

Referring now to a preferred embodiment of the hanger as shown in FIGS. 1 and 2, a U-shaped member 10 is constructed of a flat metal bar or similar deformable material that is bent or formed as a U having two substantially parallel legs 11 and 12. The parallel legs are joined by a connecting web 13 which is preferably rounded as shown in FIG. 1. The radius of the curve of the web is small compared to the length of the parallel legs 11 and 12 so as to permit a number of electric cables or tubular members 14 to be stacked within the U-shaped member. Here it should be noted that the end portions on legs 11 and 12 may be slightly flanged outward to facilitate insertion of the tubular members or cables 14 within the U-shaped member. One leg 11 of the U-shaped member 10 is connected to a mounting portion 16 of a securing means. The mounting portion is secured to leg 11 by welding, brazing or gluing etc., so as to provide a secure attachment of the portion to the leg. An anchor portion 15 is rigidly affixed to a supporting surface 17 by welding, although other means can be used and still be within the scope of the invention. Mounting portion 16 and anchor portion 15 are releasably connectable by means of tapped well in anchor portion 15 and a correspondingly threaded projection on mounting portion 16.

FIG. 3 shows the clamp 18 with the opposing sides 19 and 20 as they appear before being secured on the U-shaped member 10. Phantom lines of the opposing sides 19 and 20 show the clamp as it appears after being mounted on the U-shaped member in an abutting relationship with the cables 14 as will be explained below.

In using the hanger the clamp 18 is removed from the U-shaped member 10 and electric cables 14 or similar tubularly-shaped members are positioned within the U-shaped member in a stacked relationship as shown in FIGS. 1 and 2. Any number of cables may be stacked in this manner within the hanger from one to such a number of cables as entirely fill the length of the legs 11 and 12. When the desired number of cables have been stacked within the member 10, the electrician or operator places clamp 18 fitting around member 10 with the space between opposed ends 21, 22 located on the side of the hanger on which the mounting portion 16 is mounted. In this embodiment the mounting portion 16 is connected to an outer surface of leg 11. The operator then slides clamp 18 along the legs of the U-shaped member to abut the top one of the stacked cables in the member 10. When the clamp 18 firmly abuts the top one of the cables 14 the operator deforms the opposed sides 19, 20 to force the opposed ends 21, 22 toward each other as shown in FIG. 3. Deforming the opposing sides can be easily done by the operator with a pliers thereby requiring no special tools for this operation. When deformed, the opposed sides 19, 20 clamp onto parallel legs 11, 12 and tend to hold the stacked cables within member 10. After clamp 18 has been deformed, the space between opposed ends 21, 22 is wide enough to permit clamping of clamp 18 at that portion on the member 10 where the mounting portion is located. That is to say, the mounting portion 16 will not interfere with the clamp 18 if the clamp must be disposed immediately adjacent the mounting portion. End portions 11a and 12a, being of the same deformable material as are legs 11 and 12, are bent outwardly and away from one another, to secure the clamp 18 adjacent to the top one of cables 14, such deformation of the end portions 11a and 12a can easily be done by the operator by means of a pliers or a similiar tool carried with the operator. In the drawing only end portion 11a is shown deformed, for this by itself would secure the clamp 18 abutting the cables 14 but the operator could additionally deform 12a as explained above.

U-shaped member 10 and clamp 18 could be made out of any metal that is preferably a galvanized metal to better withstand the effects of temperature and moisture. These elements could also be constructed of plastic compounds or similar materials to render the hanger impervious to nature.

FIGS. 1 and 2 show a hanger which is specially adapted to be used or mounted on a vertical wall or bulkhead. The embodiment shown in FIGS. 4 and 5 is specifically adaptable to use on a horizontal supporting surface. The reference characters enumerated for FIGS. 1 and 2 will be the same on corresponding parts in FIGS. 4 and 5. Leg 11 is provided with an extension 11b bent to form a right angle with the leg. The extension is connected to mounting portion 16 in a manner as set forth above and the technique used in securing a plurality of stacked cables within the U-shaped member 10 is identical as that explained before. However, only one end portion 12a is adaptable to be deformed to secure the clamp 18 on the parallel leg 11, 12.

The simplicity and rugged nature of the hanger make this hanger especially adaptable in the situations where the adverse effects of weather are encountered. An inherent feature of the hanger's design is the fact that, while securely supporting any number of cables from a surface, the hanger itself takes up very little space and may be positioned very close to a wall or ceiling.

The ability of the hanger of being easily removable from the supporting structure by reason of the disconnectable mounting portion 16 and anchor portion 15 is a great advantage to an electrician since this feature permits the electrician to concentrate on electric circuitry involved rather than concerning himself with securing the hanger to the wall since anchor portion 15 could have previously been anchored by a welding crew.

While the invention has been described in detail with respect to two preferred embodiments it will be understood by those skilled in the art that various changes and modifications may be made without departing from the spirit and scope of the invention and it is intended therefore to cover all such modifications in the appended claims.

What is claimed is:

1. A hanger for supporting a plurality of tubular members in a stacked relationship comprising;
   a U-shaped member having two substantially parallel legs and a connecting web, said legs being spaced to provide lateral support for the stacked tubular members,
   a clamp sized to substantially encompass said legs and adapted to be disposed in an abutting relationship with the outer one of said stacked tubular members for securely holding said stacked tubular members between said clamp and said web, at least one of said legs extending through said clamp and being deformable to secure said clamp in said abutting relationship, and
   means for supporting said U-shaped member being connected to only one of said parallel legs.

2. A hanger according to claim 1 wherein;
   said clamp is deformable to grip said legs when in said abutting relationship, and
   both of said legs extend through said clamp and are deformable to forceably secure said clamp in said abutting relationship.

3. A hanger according to claim 2 wherein;
   said clamp is slidably positionable along said legs and has its opposing ends spaced to permit bypassing of said means for supporting when being slideably positioned.

4. A hanger according to claim 3 wherein;
   said U-shaped member is formed from a flat deformable bar to provide said legs with opposed flat surfaces and a curved connecting web.

5. A hanger according to claim 4 wherein said means for supporting said U-shaped member includes;
   a mounting portion connected to one of said legs, and
   an anchor portion adapted to be affixed to a supporting surface, said mounting portion and said anchor portion being releasably connectable.

6. A hanger according to claim 5 wherein;
   said mounting portion is perpendicularly mounted on an outer surface of one of said legs.

7. A hanger according to claim 4 wherein;
   the end portion of one of said legs extends outwardly of and perpendicularly to said legs, and
   said mounting portion is perpendicularly mounted on said end portion.

References Cited by the Examiner

UNITED STATES PATENTS

| | | | |
|---|---|---|---|
| 2,931,607 | 4/1960 | McFarland | 248—68 |
| 3,120,938 | 2/1964 | Lucas | 248—68 |

FOREIGN PATENTS

| | | |
|---|---|---|
| 576,249 | 5/1959 | Canada. |
| 883,068 | 3/1943 | France. |
| 891,776 | 10/1953 | Germany. |

CLAUDE A. LE ROY, *Primary Examiner.*